United States Patent
Smith

(10) Patent No.: US 10,634,233 B1
(45) Date of Patent: Apr. 28, 2020

(54) EFFICIENCY BASED GEARBOX COOLING CONTROL

(71) Applicant: Rolls-Royce Corporation, Indianapolis, IN (US)

(72) Inventor: Alan Smith, Greenwood, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 2 days.

(21) Appl. No.: 16/204,758

(22) Filed: Nov. 29, 2018

(51) Int. Cl.
*F16H 57/04* (2010.01)
*F01D 25/12* (2006.01)
*F02C 7/36* (2006.01)
*F02K 3/06* (2006.01)

(52) U.S. Cl.
CPC ......... *F16H 57/0413* (2013.01); *F01D 25/12* (2013.01); *F02C 7/36* (2013.01); *F02K 3/06* (2013.01); *F16H 57/0417* (2013.01); *F16H 57/0486* (2013.01); *F05D 2260/213* (2013.01); *F05D 2260/40311* (2013.01)

(58) Field of Classification Search
None
See application file for complete search history.

(56) References Cited

U.S. PATENT DOCUMENTS

| | | | |
|---|---|---|---|
| 4,215,412 A | 7/1980 | Bernier | |
| 6,823,253 B2 | 11/2004 | Brunell | |
| 7,836,680 B2 | 11/2010 | Schwarz | |
| 7,945,397 B2 | 5/2011 | Kar | |
| 7,984,606 B2* | 7/2011 | Smith | F02C 7/14 60/266 |
| 8,572,943 B1 | 11/2013 | Sheridan | |
| 9,593,591 B2 | 3/2017 | Phillips | |
| 9,830,747 B2 | 11/2017 | Apps | |
| 9,915,585 B2 | 3/2018 | Pettersson | |
| 10,384,792 B2* | 8/2019 | Snyder | B64D 13/06 |
| 10,400,671 B2* | 9/2019 | Papa | F01D 25/12 |
| 2010/0313591 A1* | 12/2010 | Lents | F02C 7/10 62/259.2 |

OTHER PUBLICATIONS

Gray, D.E., et al., "NASA—Energy Efficient Engine Preliminary Design and Integration Studies," Report No. NASA CR—135396, United Technologies Corporation, Pratt & Whitney Aircraft Group, Commercial Products Division, Nov. 1978, 366 pages, East Hartford, CT, USA.

* cited by examiner

*Primary Examiner* — Dirk Wright
(74) *Attorney, Agent, or Firm* — Brinks Gilson & Lione

(57) ABSTRACT

A processing system can include one or more processors configured to: automatically transition an operating condition of a gearbox cooling system through a plurality of operating states; determine an efficiency of the gearbox at each of a plurality of the operating states; for each of the plurality of operating states: select a future operating state of the cooling system based on the determined gearbox efficiency at the current operating state.

24 Claims, 5 Drawing Sheets

EFFICIENCY BASED GEARBOX COOLING CONTROL

CROSS-REFERENCE

The present application relates to U.S. patent application Ser. No. 16/118,097 to Alan Smith entitled EFFICIENCY-BASED MACHINE CONTROL, which was filed on Aug. 30, 2018 and is hereby incorporated by reference.

BACKGROUND

Field of the Disclosure

Among other things, the present disclosure relates to cooling of gearboxes disposed in a gas turbine engine.

Description of Related Art

Gas turbine engines may include power and accessory gearboxes. One example is an epicyclic gearbox disposed between a low pressure mainshaft and a fanshaft in a geared turbofan engine. The epicyclic gearbox can perform speed reduction where the mainshaft rotates at a higher speed while driving the fanshaft through the gearbox at a lower speed. Among other things, implementing a geared speed differential between the mainshaft and the fanshaft can make an aircraft engine quieter and more fuel efficient.

SUMMARY

A gas turbine engine can include a mainshaft, a second shaft, a gearbox, a cooling system, and a processing system. The mainshaft can be coupled to a fanshaft through an epicyclic gearbox, or to an auxiliary shaft through an accessory gearbox. The cooling system can be configured to transfer heat from the gearbox to a heat sink.

The processing system can include one or more processors configured to: automatically transition an operating condition of the cooling system through a plurality of operating states; determine an efficiency of the gearbox at each of a plurality of the operating states; for each of the plurality of operating states: select a future operating state of the cooling system based on the determined gearbox efficiency at the current operating state.

A gas turbine engine can include a mainshaft coupled to a fanshaft through an epicyclic gearbox including a sun gear, a ring gear, and a plurality of intermediate gears meshed there between. A cooling system can be configured to transfer heat from the epicyclic gearbox to a heat sink.

A processing system can include one or more processors configured to: receive a user-selected power setting; search for a combination of gearbox coolant and lubrication system parameters at the power setting that minimizes a heat loss rate.

In a gas turbine engine including (i) a mainshaft coupled to a second shaft through a gearbox, and (ii) a cooling system configured to transfer heat from the gearbox to a heat sink, a method can include: estimating a future heat loss rate of the gearbox at a new power setting; resizing a cooling capacity of the cooling system based on the future heat loss rate before the power reaches the new power setting; causing the power to reach the new power setting. The gearbox can be an epicyclical gearbox coupling the mainshaft to a fanshaft.

BRIEF DESCRIPTION OF DRAWINGS

The present Specification may be read in conjunction with the appended Figures. The Figures show some of the illustrative embodiments discussed in the Specification. As further stated below, the claimed inventions are not limited to the illustrative embodiments. For clarity and ease of reading, Figures may omit views of certain features.

DETAILED DESCRIPTION

The present application discloses illustrative (i.e., example) embodiments. The claimed inventions are not limited to the illustrative embodiments. Therefore, many implementations of the claims will be different than the illustrative embodiments. Various modifications can be made to the claimed inventions without departing from the spirit and scope of the disclosure. The claims are intended to cover implementations with such modifications.

At times, the present application uses directional terms (e.g., front, back, top, bottom, left, right, etc.) to give the reader context when viewing the Figures. The claimed inventions, however, are not limited to the orientations shown in the Figures. Any absolute term (e.g., high, low, etc.) can be understood and disclosing a corresponding relative term (e.g., higher, lower, etc.).

Figure 1:
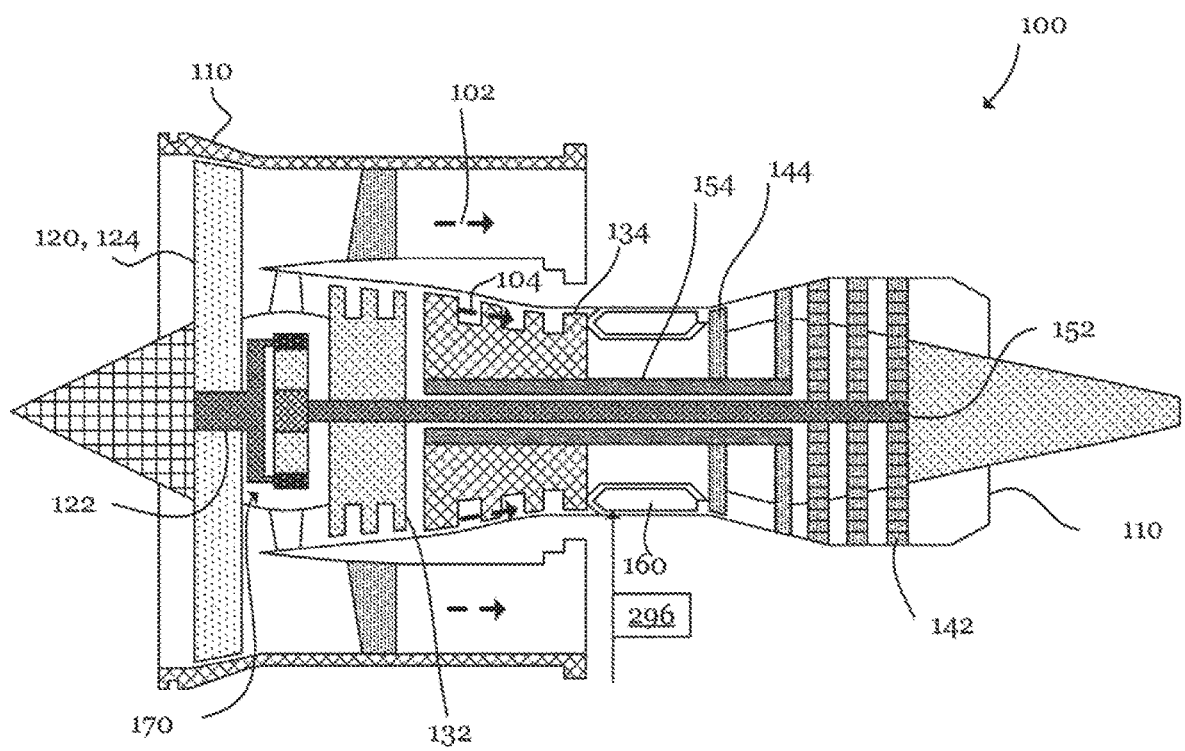
FIG. 1 schematically shows an example of a geared turbofan engine.

Referring to FIG. 1, a turbofan engine 100 can include static casing 110 for splitting air exiting a fan 120 into a bypass flow path 102 and a core flow path 104. Air following core flow path 104 can be compressed at a low pressure compressor 132 driven by a low pressure mainshaft 152 and at a high pressure compressor 134 driven by a high pressure mainshaft 154. In combustor 160, air can mix with jet fuel before being ignited. The high energy combustion products can flow through high pressure turbine 144 to drive high pressure mainshaft 154 and low pressure turbine 142 to drive low pressure mainshaft 152.

Low pressure mainshaft 152 can drive epicyclic gearbox 170, which can have, for example, a planetary or star design. In turn, epicyclic gearbox 170 can drive a fan shaft 122 to which fan blades 124 are secured. Epicyclic gearbox 170 can enable low pressure mainshaft 152 to rotate at higher speed while driving fan 120 at a lower speed. In the present specification, a reference to "mainshaft" generally means low pressure mainshaft 152 unless context dictates otherwise.

Figure 2:
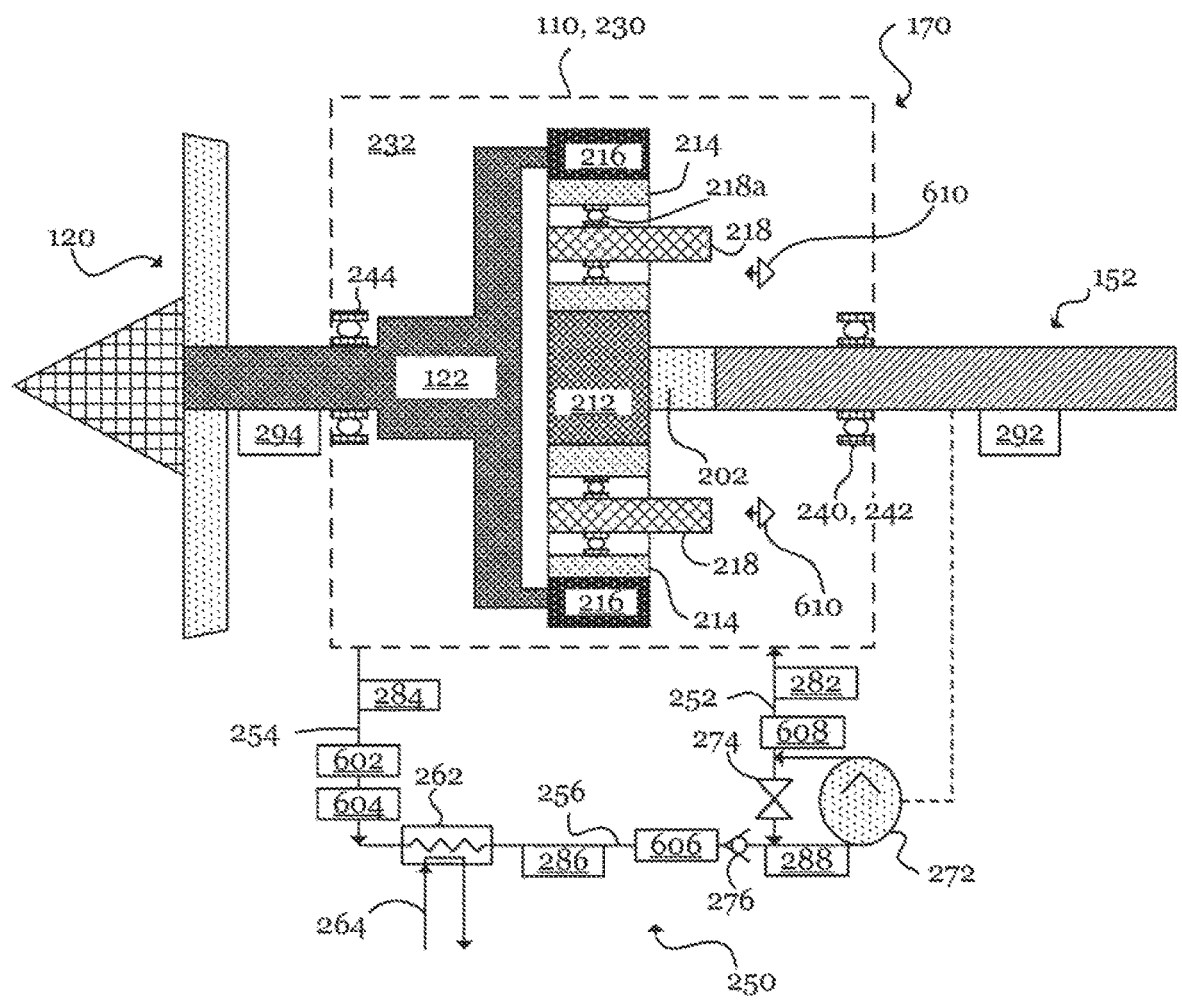
FIG. 2 schematically shows an example gearbox and cooling system for the engine.

In FIGS. 1 and 2, gearbox 170 has a star design. As illustrated in FIG. 2, low pressure mainshaft 152 can include a flexible input coupling 202 splined to a sun gear 212. Sun gear 212 can be meshed with a plurality of intermediate gears 214 (in this case, star gears) each configured to rotate about a respective arm of a static carrier 218 (only the arms are shown) flexibly mounted to static casing 110.

Radially opposite sun gear 212, the plurality of intermediate gears 214 can be meshed with a ring gear 216 sharing a central rotational axis with sun gear 212. Fanshaft 122 can be directly connected to ring gear 216 for rotation therewith. Due to its geometry, gearbox 170 can enable mainshaft 152 and sun gear 212 to rotate a higher speed while driving ring gear 716 and fanshaft 122 at a lower speed.

According to some embodiments (not shown), gearbox 170 has a planetary design where intermediate gears 214 are planet gears and configured to simultaneously (a) rotate about their central axes and (b) orbit sun gear 212. Ring gear 216 can be flexibly and statically mounted to static casing 110. Carrier 218 can be floating for rotation according to the orbital motion of the planet gears. Fanshaft 122 can be directly connected to carrier 218.

As shown in FIG. 2, gearbox 170 can include a static casing 110, 230 defining an inner volume (i.e., sump) 232 in which a working fluid, such as oil, flows. A plurality of shaft bearings 240 can be disposed within sump 232, including input bearings 242 for mainshaft 152 and output bearings 244 for fanshaft 122. Intermediate gears 214 can be rotatably mounted on carrier arms 218 through carrier bearings 218a.

Although sump 232 is shown as being a continuous volume, in some embodiments, sump 232 can be divided into separate compartments which intake and expel working fluid in series and/or parallel. Therefore, fluid inlet line 252 (further discussed below) can represent a plurality of parallel fluid inlet lines extending to separate compartments and fluid outlet line 254 (further discussed below) can represent a plurality of parallel fluid outlet lines extending from the separate compartments.

Gearbox 170 can transmit large amounts of power from mainshaft 152 to fanshaft 122 such that even proportionally small frictional inefficiencies can produce large amounts of heat. Therefore, a fluid cycle 250 can be configured to circulate a working fluid 256 (e.g., a fluid comprising oil) for lubricating and cooling the rotational features of gearbox 170. In particular, fluid cycle 250 can supply fresh working fluid via fluid inlet 252 to any gear meshes and bearing interfaces in gearbox 170. Fluid inlet 252 can lead to oil jets 610 pointing at the components of gearbox 170. The fresh working fluid can lubricate the gear meshes and bearing interfaces to provide lubrication and to absorb heat generated from friction at the gear meshes and bearing interfaces.

Hot working fluid can depart gearbox 170 via outlet line 254 toward a chip detector 602, one or more scavenge pumps 604, an oil air separator and breather, and a heat exchanger 262 configured to transfer heat from the working fluid to a secondary working fluid 264 (e.g., ambient air, refrigerant in a refrigeration cycle, water). Working fluid, after being cooled in heat exchanger 262, can flow through a tank or reservoir 606 and a check valve 276 before reaching the inlet of a fluid pump 272 (e.g., a liquid pump or a vapor compressor). Tank or reservoir 606 can be positioned downstream of the heat exchanger 262.

The oil tank, air oil separator, breather and oil supply pump can be shared with an oil system of an engine which provides oil to the entire engine and has numerous scavenge pump elements dedicated to draining the different sumps in the engine.

A bypass valve 274 can be configured to fluidly communicate the supply pump inlet with the supply pump outlet. Otherwise, the outlet of supply pump 272 can directly supply chilled and pressurized working fluid via fluid inlet line 252 and then to oil jets 610 to lubricate the gears and then draining back into sump 232, completing the cycle. As shown, a filter and bypass 608 can be provided upstream of bypass valve 274. As shown with a broken line, mainshaft 152 can drive supply pump 272 (e.g., via one or more power-take-off shafts; indirectly, via an electric generator, etc.).

A processing system ("PS") 300 (further discussed below) can include a plurality of sensors 304, including a gearbox inlet sensor 282 (also called a pump outlet sensor), a gearbox outlet sensor 284, a heat exchanger outlet sensor 286, and a pump inlet sensor 288. Each fluid sensor can be configured to measure fluid temperature, pressure, and/or flow rate. The supply pumps and scavenge pumps can also be configured to be positive displacement pumps and measure the fluid flow rates based on pump speed and pump displacement taking pump leakage into consideration. The processing system 300 can also measure the internal gearbox pressure and temperature and the pressure, flow, and temperature of the gearbox air supply.

Gearbox inlet sensor 282 can be disposed directly downstream of pump 272 and/or directly upstream of casing 230. Gearbox outlet sensor 284 can be disposed directly downstream of casing 230. Heat exchanger outlet sensor 286 can be disposed directly downstream of heat exchanger 262 and/or directly upstream of check valve 276. Pump inlet sensor 288 can be disposed directly downstream of bypass valve 274 and/or directly upstream of pump 272.

Sensors can include a first shaft sensor 292 for mainshaft 152 and a second shaft sensor 294 for fanshaft 122. Each shaft sensor can be configured to measure shaft rotational speed and/or shaft torque. Referring to FIG. 1, a fuel fluid sensor can be configured to measure temperature, pressure, and/or flow rate of jet fuel into combustor 160. PS 300 can include a sensor configured to measure any metric discussed herein.

PS 300 can approximate $HL_{total} = HL_{internal} + HL_{wf} + HL_{ht}$, where $HL_{total}$ is the total rate of heat loss for the gearbox, $HL_{internal}$ is the portion of $HL_{total}$ internally retained in the solid material of the gearbox, and $HL_{wf}$ is the portion of $HL_{total}$ absorbed by a working fluid(s) in thermal communication with the gearbox. $HL_{ht}$ is the heat transfer of the gearbox compartment to adjacent components through conduction, convection, and radiation.

When a component is in a steady state condition (e.g., when internal material temperature of the component fluctuates less than a predetermined threshold), PS 300 can assume that $HL_{internal}$ is zero such that $HL_{total} = HL_{wf} + HL_{ht}$. PS 50 can approximate $HL_{wf}$ as the sum of the heat flow absorbed by all the gearbox working fluids. The heat absorbed by the first working fluid $= Cp_{wf} * \Delta T_{wf} * Q_{wf}$, where $Cp_{wf}$ is a specific heat capacity of the first working fluid, $\Delta T_{wf}$ is the change in temperature of the first working fluid across the gearbox, and $Q_{wf}$ is a mass flow rate of the first working fluid across.

In some cases, the heat absorption of a first fluid (e.g., fluid in fluid circuit 600) may dominate the heat absorption of a second fluid (e.g., air). In such a case, PS 300 can be configured to ignore heat absorption of the second fluid. In other cases, PS 300 can be configured to consider heat absorption of all working fluids in thermal communication with the component such that $HL_{wf} = HL_{wf1} + HL_{wf2}$, where wf1 is a first working fluid and wf2 is a second working fluid. The heat transferred to the working fluid can also include the change in fluid energy due to expansion or contraction of the working fluid or changes in phase of the working fluid.

When a component is in a thermally transient condition (e.g., when internal temperature of the gearbox fluctuates more than a predetermined threshold), PS 300 can compute $HL_{internal}$ based on the sum of the rate of change of energy of the gearbox internal components. The change in energy of gearbox sub-component $X = [c]x * \Delta TRx$, where $[c]x$ is a known specific heat capacity of sub-component X and $\Delta TRx$ is the rate of temperature change in sub-component X. During a thermally transient condition, each sub-component of the gearbox can have a different heat absorption rate. Therefore, it can be advantageous to apply a unique thermal model for each solid gearbox sub-component.

By determining heat absorption of the gearbox subcomponents during a thermally transient condition, it is possible for PS 300 to more accurately determine the total heat loss (and therefore efficiency of gearbox 170, as further discussed below) without waiting for gearbox 170 to achieve a thermal steady state.

As previously discussed, when the present application discloses a formula that relies on a variable physical metric (e.g., temperature change, flow rate, pressure, etc.), it should be assumed that suitable sensor(s) are disposed at the location(s) necessary to capture such a metric. For example, when the present application discloses $\Delta T_{wf}$, various embodiments include a sensor configured to measure the temperature of fluid (e.g., oil) directly upstream of the gearbox and a sensor configured to measure the temperature of the fluid directly downstream of the gearbox. PS 300 can optimize gearbox efficiency by varying the gearbox working fluid/coolant flow and oil jet pressure by, for example, changing the pump speed or pump displacement or by bypassing a portion of the flow around the gearbox using a controlled diverter valve. A change in oil or air flow could, for example, impact the density in the oil mist to reduce heat generated by oil churning or by changing the impingement velocity of the oil jets on the gears or bearings.

Alternatively, or in addition, PS 300 can optimize gearbox efficiency by varying the temperature of the gearbox working fluid/cooling through the gearbox by changing the heat exchanger cooling by changing the temperature of the cooling fluid 264 or by changing the area of the heat exchanger or by bypassing a section of the heat exchanger. The coolant temperature change can be accomplished by continuously variable actuation or by a pulse width modulation with two or more states. Changing the oil temperature could, for example, change the viscosity of the oil to reduce the fluid viscous losses inside the gearbox.

The gearbox internal pressure and gearbox internal temperature can also be controlled to optimize efficiency by control of the gearbox pressurization air supply and control of the scavenge pump flow and gearbox vents.

By varying the gearbox lubricant pressure and flow it is possible to ensure adequate lubrication at all conditions of lubricant temperature and gearbox torque loading in order to avoid gearbox wear and also optimize lubrication at high power conditions requiring high efficiency.

The temperature of the oil can be changed to optimize the gearbox efficiency but maintain adequate oil and gearbox temperature margin. The combination of the optimum gearbox working fluid/coolant flow, pressure and temperature can be determined for each power or power condition and be stored into memory for use for future similar conditions.

Figure 4:
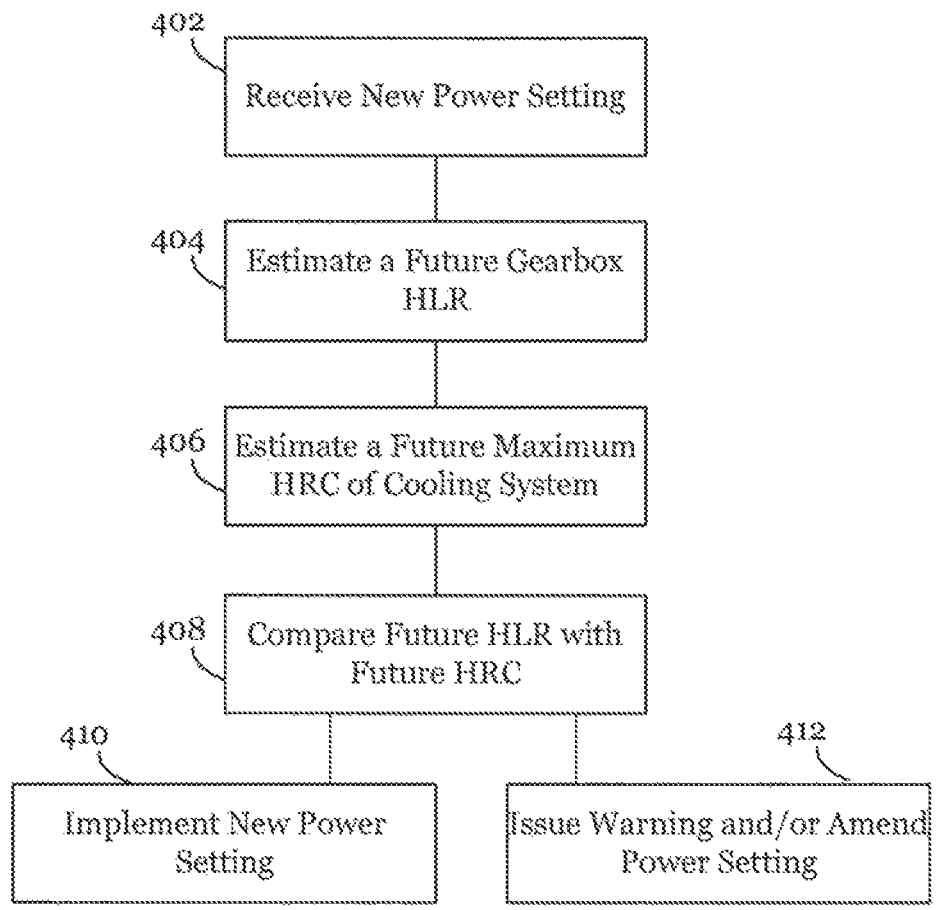
FIG. 4 is a block diagram of an example method for controlling the engine.

FIG. 4 presents a method of controlling turbofan engine 100 based on an expected future rate of gearbox heat loss ($HLR_{gearbox,future}$) and/or an expected future cooling capacity (i.e., maximum heat removal rate) of cooling system 250 ($MHRR_{cs,future}$). PS 300 can perform (i.e., PS 300 can be configured to perform) the method of FIG. 4.

At block 402, PS 300 can receive a new power setting (e.g., a new fuel throttle setting, a new gearbox lubrication setting) for turbofan engine 100. At block 404, PS 300 can estimate (i.e., determine) $HLR_{gearbox,future}$ based on the power setting (which, as described above, can be a gearbox lubrication setting) and one or more current power metrics (e.g., one or more current gearbox lubrication metrics). At block 406, PS 300 can estimate (i.e., determine) $MHRR_{cs,future}$ based on one or more power metrics (which can be gearbox lubrication metrics as discussed above) and/or one or more ambient metrics.

At block 408, PS 300 can compare $HLR_{gearbox,future}$ with $MHRR_{cs,future}$. If, at block 408, the comparison produces an acceptable result, then PS 300 can proceed to block 410. At block 410, PS 300 can control engine 100 to implement the new power setting (e.g., the new gearbox lubrication setting). For example, PS 300 can adjust a flow rate of jet fuel into combustor 160 and, in parallel, adjust a heat removal rate of cooling system 250 (which can correspond to the gearbox lubrication setting) based on $HLR_{gearbox,future}$. If, at block 408, the comparison produces an unacceptable result, then PS 300 can proceed to block 412. At block 412, PS 300 can issue a warning and/or amend the lubrication setting such that a comparison between $HLR_{gearbox,future}$ and $MHRR_{cs,future}$ becomes acceptable.

Referring to block 402, a user (e.g., an aircraft pilot) can issue a new power setting by, for example, changing the position of a lever (e.g., a throttle) to a new position. For example, PS 300 can increase the flow rate of jet fuel to turbofan engine 100 in response to registering a throttle setting increase and decrease the flow rate of jet fuel to turbofan engine 100 in response to registering a throttle setting decrease. PS 300 can further increase the flow rate of lubricant into gearbox 170 in response to registering a throttle setting increase. All else being equal, a greater power setting (e.g., gearbox lubrication setting) can translate into greater fuel burn and greater rotational speeds for fanshaft 122 and mainshafts 152, 154 while a lesser power setting can translate into lesser fuel burn and lesser rotational speeds for fanshaft 122 and mainshafts 152, 154. PS 300 can automatically issue new lubrication settings during a given power condition or flight mode.

Referring to block 404, PS 300 can estimate $HLR_{gearbox,future}$ with, for example, empirically assembled functions (e.g., look-up tables) relating previous measurements of the power setting (e.g., throttle) and $HLR_{gearbox}$. In the context of this method, "future" can mean a predetermined amount of time into the future (e.g., ten seconds) or "future" can mean the time when a predetermined event occurs (e.g., when a sufficiently steady state at the new power setting, such as lubrication setting, occurs).

Referring to block 406, PS 300 can project (i.e., determine) $MHRR_{cs,future}$ with one or more empirically assembled functions (or equivalent look-up tables) relating previous maximum cooling capacities of cooling system 250 with one or more ambient conditions (e.g., temperature, humidity) and/or power metrics (e.g., maximum power available for pump 272, maximum power available for a compressor driving secondary refrigerant or coolant 264, etc.). In some embodiments, $MHRR_{cs,future}$ can be the maximum allowable capacity of cooling system 250.

At block 408, PS 300 can compare $HLR_{gearbox,future}$ with $MHRR_{cs,future}$ by, for example, applying a safety factor (e.g., 1.5) to $HLR_{gearbox,future}$. If (Safety Factor)* $HLR_{gearbox,future} \leq MHRR_{cs,future}$, then PS 300 can proceed to block 410. Otherwise, PS 300 can proceed to block 412.

As stated above, PS 300 can implement the new power setting (e.g., gearbox lubrication setting) at block 410 by adjusting a flow rate of jet fuel into combustor 160, and, in parallel, adjusting a heat removal rate of cooling system 250 based on $HLR_{gearbox,future}$. According to some embodiments, PS 300 will only adjust a heat removal rate of cooling system 250 based on $HLR_{gearbox,future}$ when $HLR_{gearbox,future} > HLR_{gearbox,current}$. Otherwise, PS 300 can control a heat removal rate of cooling system 250 based on $HLR_{gearbox,current}$.

In some embodiments, PS 300 can implement the new power setting (e.g., gearbox lubrication setting) in consecutive stages. For example, PS 300 can resize cooling capacity of cooling system 250 to accommodate $HLR_{gearbox,future}$ before beginning to adjust the power based on the new power setting. PS 300 can resize cooling system 250 by, for example, increasing the speed of pump 272, closing valve 274, increasing the speed of a pump (e.g., refrigerant compressor) configured to circulate secondary refrigerant or coolant 264, etc.

At block 412, PS 300 can issue a pilot warning (e.g., present a message on a display or activate a warning light) and/or automatically amend the power setting until (Safety Factor)*$HLR_{gearbox,future}$>$MHRR_{cs,future}$. PS 300 can be configured to display a warning, but not automatically amend the power setting if (Safety Factor)*$HLR_{gearbox,future}$>$MHRR_{cs,future}$>$HLR_{gearbox,future}$. PS 300 can be configured to display a warning and automatically amend the power setting if $MHRR_{cs,future}$>$HLR_{gearbox,future}$.

After block 410 and/or block 412, PS 300 can return to return to block 404, even if the power setting remains constant. Therefore, PS 300 can continuously cycle through the method of FIG. 4 to continuously resize cooling system 250 due to transient conditions.

When performing FIG. 4, PS 300 can use any suitable technique for determining $HLR_{gearbox}$. PS 300 can approximate: $HLR_{gearbox}=P_{input}-P_{output}=V_{mainshaft}*\tau_{mainshaft}-V_{fanshaft}*\tau_{fanshaft}=P_{input}-P_{input}*\eta_{gearbox}$, where V is rotational speed, $\tau$ is torque, and $\eta$ is efficiency. PS 300 can approximate: $HLR_{gearbox}=HLR_{internal}+HLR_{wf}$, where $HLR_{internal}$ is the heat absorption rate of solid material defining gearbox 170 and $HLR_{wf}$ is the heat absorption rate of working fluid(s) in thermal communication gearbox 170. As discussed above, torque and rotational sensors can be disposed to capture $V_{mainshaft}$, $\tau_{mainshaft}$, $V_{fanshaft}$, and $\tau_{fanshaft}$.

For any given working fluid (e.g., oil), PS 300 can approximate: $HLR_{wf}=Cp_{wf}*\Delta T_{wf}*Q_{wf}$ where $Cp_{wf}$ is a specific heat capacity of the working fluid, $\Delta T_{wf}$ is the change in temperature of the working fluid across gearbox 170 (e.g., temperature at inlet sensor 282 subtracted from temperature at outlet sensor 284) and $Q_{wf}$ is a mass flow rate of the working fluid across component gearbox 170 (e.g., the rate of fluid flow measured at outlet sensor 284).

PS 300 can compute $HLR_{internal}=c_{material}*\Delta TR$, where c material is a known specific heat capacity of gearbox material and $\Delta TR$ is the rate of temperature change in the gearbox material. Since many different materials and many different geometries can define gearbox 170, the accuracy of $HLR_{internal}$ can be enhanced by breaking $c_{material}*\Delta TR$ into subcomponents (e.g., a unique thermal model for each solid component in gearbox 170). By determining heat absorption of solid components during a thermally transient condition, it is possible for PS 300 to more accurately determine the total heat loss (and therefore efficiency of gearbox 170) without waiting for gearbox 170 to achieve a perfect thermal steady state.

Figure 5:
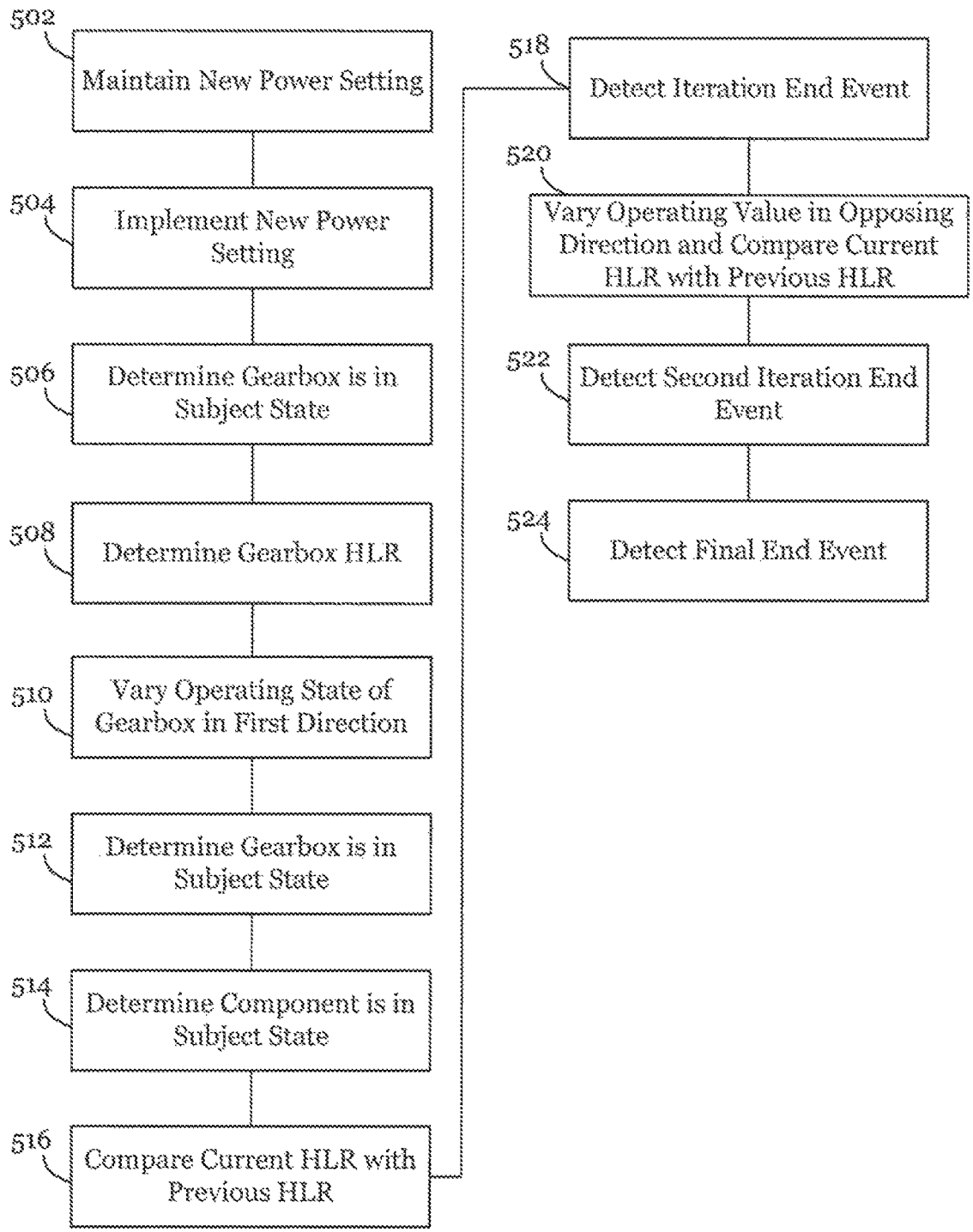
FIG. 5 is a block diagram of an example method for controlling the engine.

FIG. 5 illustrates a method of finding (i.e., determining) an efficient operating state for gearbox 170. According to some embodiments, the method of FIG. 5 can be applied to minimize heat loss of gearbox 170. According to other embodiments, the method of FIG. 5 can be applied to minimize aggregate heat loss of gearbox 170 and cooling system 250 by, for example, adding the heat loss rates of any mechanical fluid pumps (e.g., pump 272) to $HLR_{gearbox}$.

At block 502, a user (e.g., a pilot, operator or a software program) can instruct PS 300 to maintain a new power setting (e.g., throttle setting). Block 502 can include any features of block 402, as discussed above. At block 504, PS 300 can implement the new power setting. According to some embodiments, PS 300 can implement the new power setting by applying the method of FIG. 4.

At block 506, PS 300 can determine that engine 100 has fully implemented the new power setting (e.g., changed the throttle setting) and that gearbox 170 has attained a subject state based on, for example, $HLR_{gearbox}$ fluctuating less than a predetermined magnitude for at least a predetermined amount of time (e.g., remaining within a range of ±500 watts). A subject state can be a transient state or a steady state (e.g., a quasi-steady state). The predetermined magnitude can be a function of a running average of $HLR_{gearbox}$. PS 300 can determine whether gearbox 170 has attained a subject state based on a derivate of $HLR_{gearbox}$ being less than a predetermined magnitude.

At block 508, PS 300 can determine $HLR_{gearbox}$ using any of the above-described techniques. For example, PS 300 can approximate: $HLR_{gearbox,1}=Cp_{wf}*\Delta T_{wf}*Q_{wf}$ or $HLR_{gearbox,1}=V_{mainshaft}*\tau_{mainshaft}-V_{fanshaft}*T_{fanshaft}$, where "1" means a first iteration (also called "cycle"). To enhance accuracy, PS 300 can incorporate heat absorption into the gearbox material as discussed above.

After block 508, PS 300 can continuously make small adjustments in the lubrication or cooling settings to search for the operating value within a predetermined band that minimizes heat loss rate (e.g., $HLR_{gearbox}$). At block 510, PS 300 can vary the lubrication or cooling settings in a first direction (e.g., increase or decrease) and by a first magnitude (e.g., by 3% of running average). At block 512, PS 300 can determine that gearbox 170 has attained the subject state by, for example, reapplying the logic of block 506.

At block 514, PS 300 can determine $HLR_{gearbox,2}$, where "2" means the second iteration after the first, using the techniques described for block 508. At block 516, PS 300 can compare $HLR_{gearbox,2}$ with $HLR_{gearbox,1}$. If $HLR_{gearbox,2}$ is smaller, then PS 300 can return to block 510.

PS 300 can continue repeating blocks 510-516 until an iteration end event occurs. An iteration end event can occur when (a) $HLR_{gearbox,N}<HLR_{gearbox,N+1}$ where "N" is any arbitrary whole number and/or (b) a subsequent iteration causes any component of system 10 to exceed an operating limit. Operating limits can, for example, prevent the operating value from straying beyond a predetermined band (e.g., ±4%) around a predetermined lubrication setting to reduce risk of optimization not functioning correctly.

When an iteration end event occurs at block 518, PS 300 can, at block 520, repeat blocks 510-516, except by varying the lubrication or cooling condition in the opposing second direction (e.g., decrease or increase) and by a second magnitude (e.g., 1.5% of running average). The second magnitude can be smaller than the first magnitude if PS 300 determined that $HLR_{gearbox,2}<HLR_{gearbox,1}$. Otherwise, the second magnitude can be greater than or equal to the first magnitude. Once reaching the second iteration end event at block 522, PS 300 can repeat block 520, by varying the operating value in the first direction and by a third magnitude (e.g., 0.5% of running average). PS 300 can continue cycling through blocks 520 and 522 (i.e., switching directions and decreasing magnitude) until a final end event occurs (block 524). The final end event can be a predetermined amount of time elapsing, a predetermined number of iterations being performed, and/or receiving a new desired power setting, at which point PS 300 can return to block 502.

Figure 3:
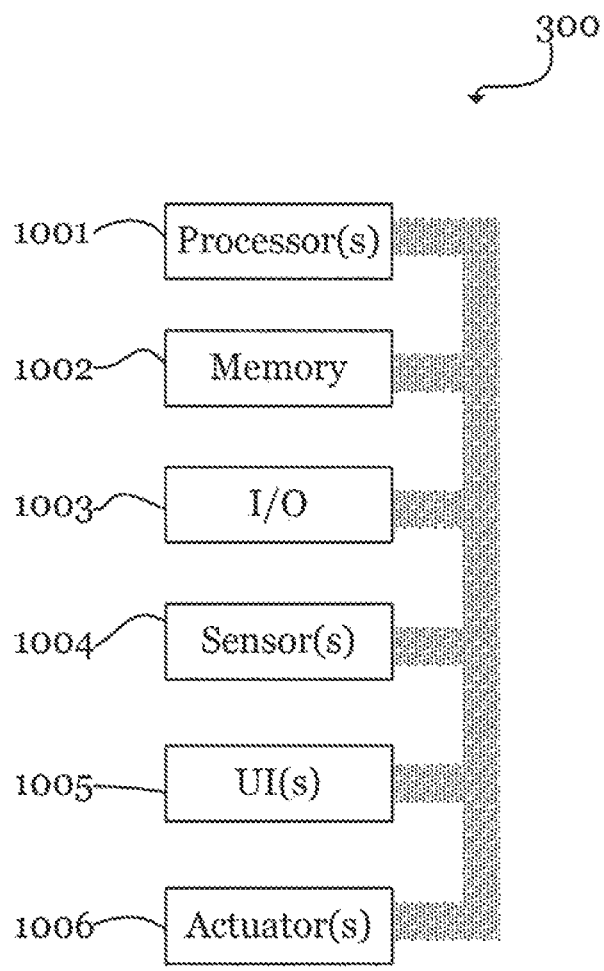
FIG. 3 is a block diagram of a processing system.

Turbofan engine 100 can include processing system ("PS") 300. Referring to FIG. 3, PS 300 can include one or more processors 1001, memory 1002, one or more input/ output devices 1003, one or more sensors 1004, one or more user interfaces 1005, and one or more actuators 1006.

Processors 1001 can include one or more distinct processors, each having one or more cores. Each of the distinct processors can have the same or different structure. Processors 1001 can include one or more central processing units (CPUs), one or more graphics processing units (GPUs), circuitry (e.g., application specific integrated circuits (ASICs)), digital signal processors (DSPs), and the like. Processors 1001 can be mounted on a common substrate or to different substrates.

Processors 1001 are configured to perform a certain function, method, or operation at least when one of the one or more of the distinct processors is capable of executing code, stored on memory 1002 embodying the function, method, or operation. Processors 1001 can be configured to perform any and all functions, methods, and operations disclosed herein.

For example, when the present disclosure states that PS 300 performs/can perform task "X", such a statement should be understood to disclose that PS 300 can be configured to perform task "X". PS 300 are configured to perform a function, method, or operation at least when processors 1001 are configured to do the same.

Memory 1002 can include volatile memory, non-volatile memory, and any other medium capable of storing data. Each of the volatile memory, non-volatile memory, and any other type of memory can include multiple different memory devices, located at multiple distinct locations and each having a different structure.

Examples of memory 1002 include a non-transitory computer-readable media such as RAM, ROM, flash memory, EEPROM, any kind of optical storage disk such as a DVD, a Blu-Ray® disc, magnetic storage, holographic storage, an HDD, an SSD, any medium that can be used to store program code in the form of instructions or data structures, and the like. Any and all of the methods, functions, and operations described in the present application can be fully embodied in the form of tangible and/or non-transitory machine-readable code saved in memory 1002.

Input-output devices 1003 can include any component for trafficking data such as ports, antennas (i.e., transceivers), printed conductive paths, and the like. Input-output devices 1003 can enable wired communication via USB®, DisplayPort®, HDMI®, Ethernet, and the like. Input-output devices 1003 can enable electronic, optical, magnetic, and holographic, communication with suitable memory 1003. Input-output devices 1003 can enable wireless communication via WiFi®, Bluetooth®, cellular (e.g., LTE®, CDMA®, GSM®, WiMax®, NFC®), GPS, and the like. Input-output devices 1003 can include wired and/or wireless communication pathways.

Sensors 1004 can capture physical measurements of environment and report the same to processors 1001. Examples of sensors 1004 include pressure sensors, temperature sensors, and flow rate sensors, which can be disposed at any (e.g., every) point in the cooling circuit diagrams. User interface 1005 can include displays (e.g., LED touchscreens (e.g., OLED touchscreens), physical buttons, speakers, microphones, keyboards, and the like. Actuators 1006 can enable processors 1001 to control mechanical forces. For example, actuators can be electronically controllable motors disposed in pumps, valves, and compressors. Every valve, pump, and compressor discussed herein can be independently controllable by PS 300 based on pressure and/or temperature measurements.

PS 300 can be distributed. For example, some elements of PS 300 can be disposed inside an aircraft body while other elements of PS 300 can be disposed in turbofan engine 100. PS 300 can have a modular design where certain features have a plurality of the aspects shown in FIG. 3. For example, I/O modules can include volatile memory and one or more processors.

I claim:

1. A gas turbine engine comprising:
   a mainshaft coupled to a second shaft through a gearbox;
   a cooling system configured to transfer heat from the gearbox to a heat sink;
   a processing system comprising one or more processors configured to:
   automatically transition an operating condition of the cooling system through a plurality of operating states;
   determine an efficiency of the gearbox at each of a plurality of the operating states; and
   for each of the plurality of operating states: select a future operating state of the cooling system based on the determined gearbox efficiency at the current operating state.

2. The engine of claim 1, wherein the one or more processors are configured to:
   calculate efficiency of the gearbox based on heat flow into the cooling system.

3. The engine of claim 2, wherein the one or more processors are configured to:
   calculate efficiency of the gearbox based on conductive, convective, and radiative heat transfer to surrounding solid material and/or air.

4. The engine of claim 3, wherein the one or more processors are configured to: calculate heat transfer from the gearbox to a piece of surrounding material based on a rate of temperature change of the piece of surrounding material.

5. The engine of claim 4, wherein the one or more processors are configured to: calculate the heat absorbed by one or more gearbox sub-components due to the gearbox material changing temperature.

6. The engine of claim 1, wherein the one or more processors are configured to:
   determine an optimum operating state of the cooling system based on the determined gearbox efficiencies;
   record the optimum operating state in memory;
   monitor for changes in efficiency of the gearbox to track gearbox wear and thereby predict necessary maintenance of the gearbox.

7. The engine of claim 6, wherein the one or more processors are configured to determine fluid flow, fluid pressure, and fluid temperature of coolant flowing through the cooling system during each of the operating states.

8. The engine of claim 6, wherein the operating states of the cooling evaluated to optimize gearbox efficiency include gearbox lubricant or coolant temperature, pressure or flow or a combination thereof.

9. The engine of claim 6, wherein the operating states of the gearbox to optimize gearbox efficiency include the gearbox internal temperature, gearbox internal pressure and gearbox air flow or a combination of these states and the operating states of claim 8.

10. The engine of claim 1, wherein said gearbox is an epicyclical gearbox coupling said mainshaft to a fanshaft.

11. The engine of claim 1, wherein said gearbox is an accessory gearbox coupling said mainshaft to an auxiliary shaft.

12. A gas turbine engine comprising:
a mainshaft coupled to a second shaft through a gearbox;
a cooling system configured to transfer heat from the gearbox to a heat sink;
a processing system comprising one or more processors configured to:
receive an updated power setting;
estimate a future heat removal capacity of the cooling system and a future heat loss rate of the gearbox based on the updated power setting; and adjust the cooling system based on the estimated future heat loss rate of the gearbox.

13. The gas turbine engine of claim 12, wherein the power setting is a speed setting, the updated power setting is a new speed setting, the future heat loss rate of the gearbox is a projection of the heat loss rate of gearbox after the gas turbine engine implements the new speed setting.

14. The engine of claim 12, wherein the one or more processors are configured to estimate future heat removal capacity of the cooling system based on a different power or speed setting.

15. The gas turbine engine of claim 12, wherein the one or more processors are configured to determine and optimize the size of the cooling capacity of the cooling system to maximize gearbox efficiency or minimize gearbox heat loss by resizing the cooling system capacity.

16. The engine of claim 15, wherein resizing the cooling system capacity is achieved by changing a coolant flow rate through the cooling system.

17. The engine of claim 15, wherein resizing the cooling system capacity is achieved by diverting coolant flow past a portion of a heat exchanger using a continuously variable diverter valve or a pulse width modulated diverter valve.

18. The engine of claim 15, wherein resizing the cooling system capacity is achieved by changing the flow rate or temperature of a secondary fluid that removes the heat from the heat exchanger.

19. The engine of claim 12, wherein the one or more processors are configured to determine a current heat loss rate based on a temperature differential of working fluid across the gearbox.

20. A gas turbine engine comprising:
a mainshaft coupled to a fanshaft through an epicyclic gearbox comprising a sun gear, a ring gear, and a plurality of intermediate gears meshed there between;
a cooling system configured to transfer heat from the epicyclic gearbox to a heat sink;
a processing system comprising one or more processors configured to:
receive a user-selected power setting;
search for a combination of gearbox coolant and lubrication system parameters at the power setting that minimizes a heat loss rate.

21. The gas turbine engine of claim 20, wherein the user-selected power setting is a speed setting and the one or more processors are configured to automatically test a plurality of speed values within the speed band to find a speed value that minimizes a heat loss rate and maximizes efficiency of the epicyclic gearbox.

22. The gas turbine engine of claim 20, wherein the one or more processors are configured to compare, at each of a plurality of different power values within the power band, a current heat loss rate or efficiency of the epicyclic gearbox with an earlier heat loss rate or efficiency of the epicyclic gearbox.

23. In a gas turbine engine comprising (i) a mainshaft coupled to a second shaft through a gearbox comprising; and (ii) a cooling system configured to transfer heat from the gearbox to a heat sink, a method comprising:
estimating a future heat loss rate of the gearbox at a new power setting;
resizing a cooling capacity of the cooling system based on the future heat loss rate before the power reaches the new power setting;
causing the power to reach the new power setting.

24. The method of claim 23, wherein the gearbox is an epicyclical gearbox coupling the mainshaft to a fanshaft.

* * * * *